(12) United States Patent
Nam et al.

(10) Patent No.: US 11,394,084 B2
(45) Date of Patent: Jul. 19, 2022

(54) SEPARATOR AND ELECTROCHEMICAL DEVICE INCLUDING THE SAME

(71) Applicant: LG CHEM, LTD., Seoul (KR)

(72) Inventors: Kwan-Woo Nam, Daejeon (KR); Min-Ji Gu, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 0 days.

(21) Appl. No.: 16/336,324

(22) PCT Filed: Nov. 17, 2017

(86) PCT No.: PCT/KR2017/013147
§ 371 (c)(1),
(2) Date: Mar. 25, 2019

(87) PCT Pub. No.: WO2018/093214
PCT Pub. Date: May 24, 2018

(65) Prior Publication Data
US 2020/0020910 A1   Jan. 16, 2020

(30) Foreign Application Priority Data

Nov. 18, 2016  (KR) .................. 10-2016-0154378

(51) Int. Cl.
*H01M 2/16* (2006.01)
*H01M 50/449* (2021.01)
(Continued)

(52) U.S. Cl.
CPC ..... *H01M 50/449* (2021.01); *H01M 10/0525* (2013.01); *H01M 50/446* (2021.01)

(58) Field of Classification Search
CPC ............... H01M 2/1686; H01M 2/166; H01M 10/0525; H01M 10/052; Y02E 60/122; Y02T 10/7011
See application file for complete search history.

(56) References Cited

U.S. PATENT DOCUMENTS

| | | | | |
|---|---|---|---|---|
| 6,183,901 B1 * | 2/2001 | Ying | ................... | H01M 10/052 429/129 |
| 8,771,859 B2 * | 7/2014 | Matsumoto | ......... | H01M 50/449 429/144 |

(Continued)

FOREIGN PATENT DOCUMENTS

| CN | 1969407 A | 5/2007 |
|---|---|---|
| CN | 101002347 A | 7/2007 |

(Continued)

OTHER PUBLICATIONS

English machine translation of JP 2008-210547 (Year: 2008).*

(Continued)

*Primary Examiner* — Michael L Dignan
(74) *Attorney, Agent, or Firm* — Birch, Stewart, Kolasch & Birch, LLP

(57) ABSTRACT

A separator and an electrochemical device including the same. The separator includes: a porous substrate having a plurality of pores; and a first porous coating layer and a second porous coating layer formed on one surface and the other surface of the porous substrate, respectively, and including a plurality of inorganic particles, a binder polymer disposed on a part or the whole of the surface of the inorganic particles so that the inorganic particles are connected and fixed with each other, and an anionic surfactant, wherein the inorganic particles include boehmite particles and non-boehmite particles, and the boehmite particles and the binder polymer are present at a weight ratio of 1:1-1:5.

11 Claims, 4 Drawing Sheets

(51) Int. Cl.
  *H01M 10/0525*   (2010.01)
  *H01M 50/446*   (2021.01)

(56) References Cited

U.S. PATENT DOCUMENTS

| | | | |
|---|---|---|---|
| 2006/0008700 | A1 | 1/2006 | Yong et al. |
| 2009/0111026 | A1 | 4/2009 | Kim et al. |
| 2009/0311598 | A1 | 12/2009 | Tadano |
| 2011/0159347 | A1* | 6/2011 | Shibano ............... H01M 2/1653 |
| | | | 429/144 |
| 2011/0195294 | A1 | 8/2011 | Lee et al. |
| 2011/0281171 | A1 | 11/2011 | Yong et al. |
| 2012/0328929 | A1* | 12/2012 | Matsumoto ............ H01G 9/02 |
| | | | 429/144 |
| 2013/0101888 | A1* | 4/2013 | Katayama ............ H01M 50/411 |
| | | | 429/144 |
| 2013/0149587 | A1 | 6/2013 | Yu et al. |
| 2013/0244082 | A1 | 9/2013 | Lee et al. |
| 2013/0260207 | A1* | 10/2013 | Uemura ............... H01M 50/409 |
| | | | 429/144 |
| 2014/0045031 | A1 | 2/2014 | Matsumoto et al. |
| 2014/0120402 | A1 | 5/2014 | Yu et al. |
| 2014/0272532 | A1 | 9/2014 | Park et al. |
| 2014/0295285 | A1 | 10/2014 | Lee et al. |
| 2015/0162587 | A1 | 6/2015 | Yoon et al. |
| 2015/0333308 | A1* | 11/2015 | Toyoda ............... H01M 50/461 |
| | | | 429/144 |
| 2016/0104876 | A1 | 4/2016 | Avison et al. |
| 2016/0226051 | A1 | 8/2016 | Lee et al. |

FOREIGN PATENT DOCUMENTS

| | | | | |
|---|---|---|---|---|
| CN | 101542777 | A | 9/2009 | |
| CN | 102388485 | A | 3/2012 | |
| CN | 102656719 | A | 9/2012 | |
| CN | 103493253 | A | 1/2014 | |
| CN | 103718336 | A | 4/2014 | |
| CN | 104704648 | A | 6/2015 | |
| JP | 4-92813 | A | 3/1992 | |
| JP | 2008-210541 | * | 9/2008 | ............ H01M 2/16 |
| JP | 2008-210541 | A | 9/2008 | |
| JP | 2011-76748 | A | 4/2011 | |
| JP | 2012-199203 | A | 10/2012 | |
| JP | 2014-44857 | A | 3/2014 | |
| JP | 2015-41578 | A | 3/2015 | |
| JP | 2016-189318 | A | 11/2016 | |
| KR | 10-2011-0049857 | | 5/2011 | |
| KR | 10-2012-0124239 | A | 11/2012 | |
| KR | 10-2014-0112384 | A | 9/2014 | |
| KR | 10-1485387 | B1 | 1/2015 | |
| KR | 10-1601690 | B1 | 3/2016 | |

OTHER PUBLICATIONS

Machine English translation of JP2008-210541 attached with the Non-Final Rejection dated Jul. 10, 2020 (Year: 2008).*

International Search Report, issued in PCT/KR2017/013147, dated Feb. 28, 2018.

* cited by examiner

SEPARATOR AND ELECTROCHEMICAL DEVICE INCLUDING THE SAME

TECHNICAL FIELD

The present disclosure relates to a separator d an electrochemical device including the same. More particularly, the present disclosure relates to a separator having improved metal ion adsorption capability and an electrochemical device including the same.

The present application claims priority to Korean Patent Application No. 10-2016-0154378 filed on Nov. 18, 2016 in the Republic of Korea, the disclosures of which are incorporated herein by reference.

BACKGROUND ART

Recently, energy storage technology has been given an increasing attention. Efforts into research and development for electrochemical devices have been actualized more and more, as the application of energy storage technology has been extended to energy for cellular phones, camcorders and notebook PC and even to energy for electric vehicles. In this context, electrochemical devices have been most spotlighted. Among such electrochemical devices, development of rechargeable secondary batteries has been focused. More recently, active studies have been conducted about designing a novel electrode and battery in order to improve the capacity density and specific energy in developing such batteries.

Among the commercially available secondary batteries, lithium secondary batteries developed in the early 1990's have been spotlighted, since they have a higher driving voltage and significantly higher energy density as compared to conventional batteries, such as Ni-MH, Ni—Cd and sulfuric acid-lead batteries using an aqueous electrolyte. However, such lithium ion batteries have a problem of ignition and explosion caused by the use of an organic electrolyte and a disadvantage of a difficulty in manufacture.

Recent lithium ion polymer batteries improve such a problem and disadvantage of lithium ion batteries and are expected as one of the next-generation batteries. However, such lithium ion polymer batteries still have a relatively low capacity as compared to lithium ion batteries and particularly show an insufficient discharge capacity at low temperature. Thus, there is an imminent need for improving this.

Although such electrochemical devices have been produced from many production companies, safety characteristics thereof show different signs. Evaluation and securement of safety of such electrochemical devices are very important. The most important consideration is that electrochemical devices should not damage users upon their malfunction. For this purpose, safety standards strictly control ignition and smoke emission in electrochemical devices. With regard to safety characteristics of electrochemical devices, there is great concern about explosion when an electrochemical device is overheated to cause thermal runaway or perforation of a separator. Particularly, a polyolefin-based porous substrate used conventionally as a separator for an electrochemical device shows a severe heat shrinking behavior at a temperature of 100° C. or higher due to its material property and a characteristic during its manufacturing process, including orientation, thereby causing a short-circuit between a cathode and an anode.

To solve the above-mentioned safety problems of an electrochemical device, there has been suggested a separator having a porous organic-inorganic coating layer formed by applying a mixture of an excessive amount of inorganic particles and a binder polymer onto at least one surface of a porous substrate having a plurality of pores.

However, for example, when a secondary battery is overcharged, an excessive amount of transition metal ions are dissolved out of a cathode and are inserted to an anode, and thus highly reactive transition metal is deposited on the anode surface and the cathode becomes thermally unstable. In addition, rapid exothermal reaction may occur due to the decomposition of an organic solvent used as an electrolyte. Therefore, the problems related with the safety of a battery, such as overheating, ignition and explosion, are not solved completely.

Therefore, there is still a need for a battery having novel constitutional elements capable of removing such excessive metal ions causing the safety-related problems.

DISCLOSURE

Technical Problem

The present disclosure is designed to solve the problems of the related art, and therefore the present disclosure is directed to providing a separator capable of adsorbing an excessive amount of transition metal ions from a cathode.

The present disclosure is also directed to providing an electrochemical device including the separator.

Technical Solution

To solve the above-mentioned problems, the separators according to the following embodiments are provided in one aspect of the present disclosure.

According to a first embodiment, there is provided a separator including:

a porous substrate having a plurality of pores; and a first porous coating layer and a second porous coating layer formed on one surface and the other surface of the porous substrate, respectively, wherein each of the first porous coating layer and the second porous coating layer independently include a plurality of inorganic particles, a binder polymer disposed on a part or the whole of the surface of the inorganic particles so that the inorganic particles are connected and fixed with each other, and an anionic surfactant, wherein the inorganic particles include boehmite particles and non-boehmite particles, and the boehmite particles and the binder polymer are present at a weight ratio of 1:1-1:5.

According to a second embodiment, there is provided the separator of the first embodiment, wherein the anionic surfactant is at least one selected from the group consisting of a C6-C20 alkylbenzene sulfonate salt, C6-C20 alkyl sulfonate salt, C6-C20 monoalkyl sulfate salt, C6-C20 alkylpolyglycol ether sulfate salt, C6-C20 mono- and di-alkyl sulfosuccinate salts, C6-C20 α-olefin sulfonate salt, and a C6-C20 sulfonated fatty acid salt.

According to a third embodiment, there is provided the separator of the first or the second embodiment, wherein the anionic surfactant is present in each of the first porous coating layer and the second porous coating layer independently in an amount of 0.1-20 wt % based on the weight of each of the first porous coating layer and the second porous coating layer, respectively.

According to a fourth embodiment, there is provided the separator of the third embodiment, wherein the weight ratio of the non-boehmite particles to boehmite particles in each of the first porous coating layer and the second porous coating layer is independently 1:99-99:1.

According to a fifth embodiment, there is provided the separator of any one the first to the fourth embodiments, wherein the binder polymer is used for each of the first porous coating layer and the second porous coating layer independently in an amount of 5-40 wt % based on the weight of each of the first porous coating layer and the second porous coating layer.

According to a fifth embodiment, there is provided the separator of any one the first to the fourth embodiments, wherein the binder polymer is present in each of the first porous coating layer and the second porous coating layer independently in an amount of 5-40 wt % based on the weight of each of the first porous coating layer and the second porous coating layer, respectively.

According to a seventh embodiment, there is provided the separator of any one of the first to the sixth embodiments, wherein the non-boehmite particles are inorganic particles having a dielectric constant of 5 or more, inorganic particles capable of transporting lithium ions or a combination thereof.

According to an eighth embodiment, there is provided the separator of any one of the first to the seventh embodiments, wherein the average particle diameter of the boehmite particles is 0.01-0.9 times of that of the non-boehmite particles.

According to a ninth embodiment, there is provided the separator of any one of the first to the eighth embodiments, wherein the average particle diameter of the non-boehmite particles is 0.5-3 µm.

According to a tenth embodiment, there is provided the separator of any one of the first to the ninth embodiments, wherein the average particle diameter of the boehmite particles is 0.05-0.4 µm.

According to an eleventh embodiment, there is provided the separator of any one of the first to the tenth embodiments, wherein the porous substrate is a polyolefin-based porous substrate.

According to a twelfth embodiment, there is provided the separator of any one of the first to the eleventh embodiments, wherein the binder polymer includes any one selected from the group consisting of polyvinylidene fluoride-co-hexafluoropropylene, polyvinylidene fluoride-co-trichloroethylene, polymethylmethacrylate, polybutylacrylate, polyacrylonitrile, polyvinylpyrrolidone, polyvinylacetate, polyethylene-co-vinyl acetate, polyethylene oxide, polyarylate, cellulose acetate, cellulose acetate butyrate, cellulose acetate propionate, cyanoethylpullulan, cyanoethylpolyvinylalcohol, cyanoethylcellulose, cyanoethylsucrose, pullulan and carboxyl methyl cellulose, or a combination of two or more of them.

In another aspect of the present disclosure, there is also provided the electrochemical devices according to the following embodiments.

According to a thirteenth embodiment, there is provided an electrochemical device including a cathode, an anode and a separator interposed between the cathode and the anode, wherein the separator is the same as defined in any one of the first embodiments to the twelfth embodiments.

According to a fourteenth embodiment, there is provided an electrochemical device, which is a lithium secondary battery.

Advantageous Effects

According to an embodiment of the present disclosure, an anionic surfactant is incorporated to a porous coating layer. Thus, transition metals, such as Mn, Ni, Co and Fe, dissolved out of a cathode upon overcharging are adsorbed, thereby preventing degradation of an anode caused by deposition of such transition metals on the anode. In addition, it is possible to reduce side reactions in a battery, such as reaction between a transition metal and an electrolyte, and thus to improve the cycle life and high-temperature storage capability of the battery.

Additionally, boehmite particles having relatively low density are used to assist weight lightening of a separator and an electrochemical device. Further, it is possible to control a rapid increase in internal temperature of an electrochemical device caused by abnormal operation by virtue of excellent heat-absorbing property of the boehmite particles.

DESCRIPTION OF DRAWINGS

The accompanying drawings illustrate a preferred embodiment of the present disclosure and together with the foregoing disclosure, serve to provide further understanding of the technical spirit of the present disclosure, and thus, the present disclosure is not construed as being limited to the drawing.

BEST MODE

Figure 1:
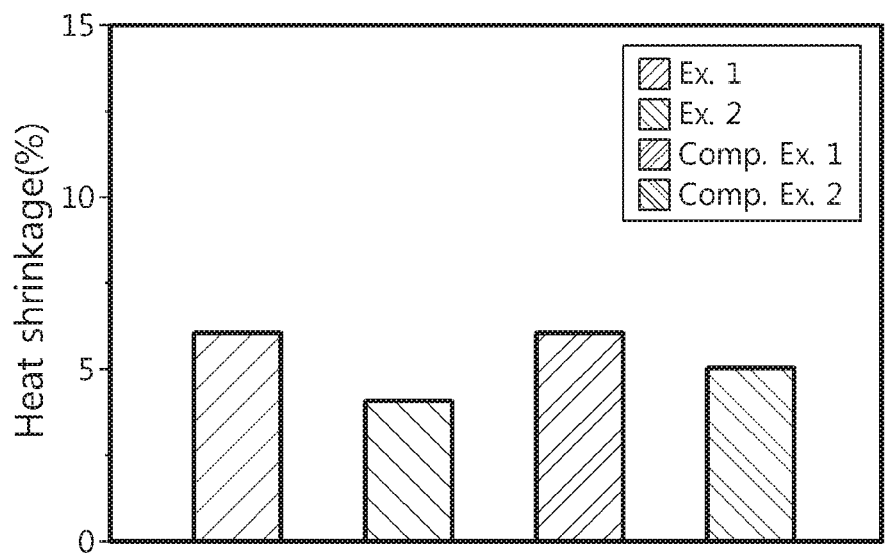
FIG. 1 is a graph illustrating the results of evaluation of the heat shrinkage of each of the separators according to Examples 1 and 2 and Comparative Examples 1 and 2.
Figure 2:
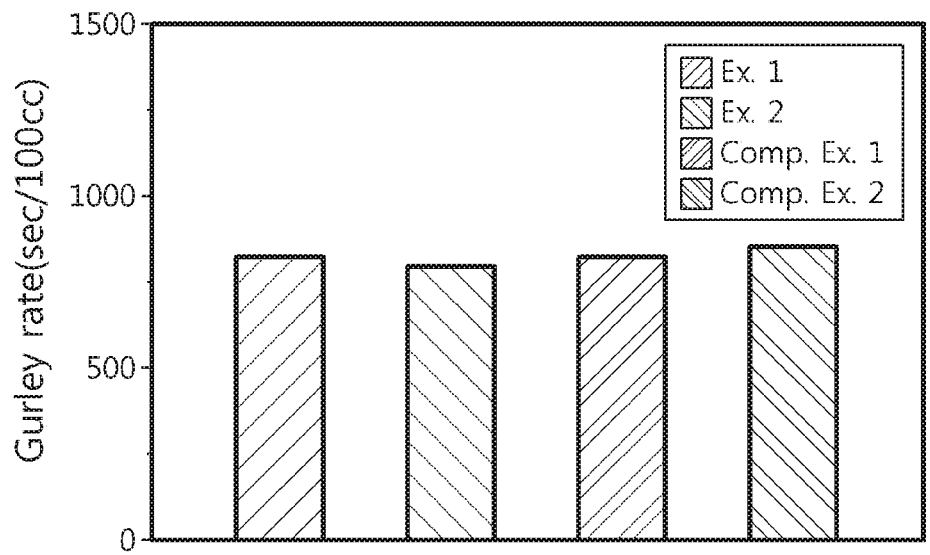
FIG. 2 is a graph illustrating the results of evaluation of the Gurley rate of each of the separators according to Examples 1 and 2 and Comparative Examples 1 and 2.
Figure 3:
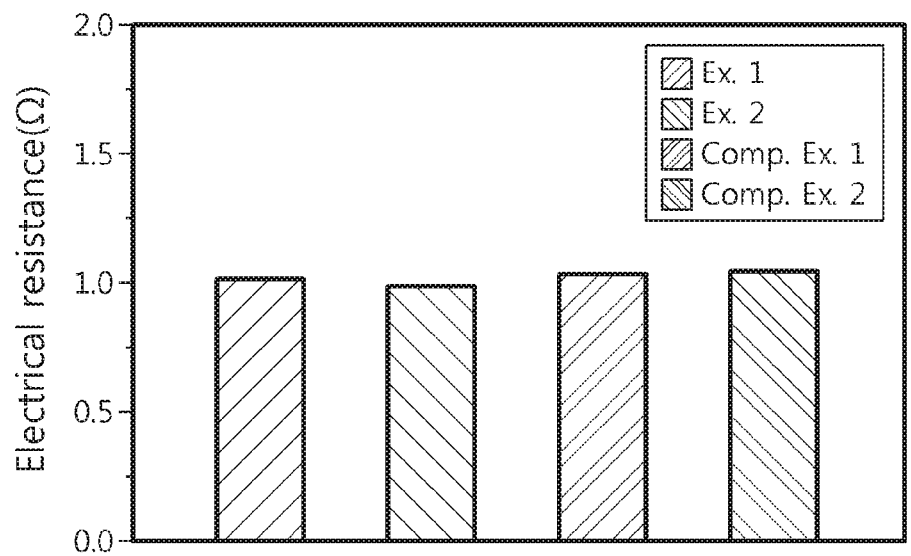
FIG. 3 is a graph illustrating the results of evaluation of the electrical resistance of each of the separators according to Examples 1 and 2 and Comparative Examples 1 and 2.

Hereinafter, the present disclosure will be described in detail. It should be understood that the terms used in the specification and the appended claims should not be construed as limited to general and dictionary meanings, but interpreted based on the meanings and concepts corresponding to technical aspects of the present disclosure on the basis of the principle that the inventor is allowed to define terms appropriately for the best explanation.

In one aspect, there is provided a separator including: a porous substrate having a plurality of pores; and a first porous coating layer and a second porous coating layer formed on one surface and the other surface of the porous substrate, respectively, and including a plurality of inorganic particles, a binder polymer disposed on a part or the whole of the surface of the inorganic particles so that the inorganic particles are connected and fixed with each other, and an anionic surfactant, wherein the inorganic particles include boehmite particles and non-boehmite particles, and the boehmite particles and the binder polymer are present at a weight ratio of 1:1-1:5.

The separator according to the present disclosure includes an anionic surfactant in a porous coating layer, and the anionic surfactant contains an anionic (i.e. negatively charged) functional group, such as sulfate, sulfonate, phosphate or carboxylate, at its head together with a positively charged counterion.

In the electrochemical device provided with the separator according to the present disclosure, the anionic surfactant functions as a scavenger which adsorbs transition metal ions, such as Mn, Ni, Co and Fe, dissolved out of a cathode upon overcharging by using the ionic functional group.

As a result, it is possible to solve several problems, including insertion of an excessive amount of such transition metals to an anode, deposition of highly reactive transition metals on the anode surface, deterioration of the anode, a thermally unstable state of a cathode, and side reactions inside of a battery, such as a reaction between a transition metal and an electrolyte. Thus, it is possible to improve the cycle life and high-temperature storage capability of a battery.

Particular examples of the anionic surfactant include but are not limited to: at least one selected from h group consisting of a C6-C20 alkylbenzene sulfonate salt, C6-C20 alkyl sulfonate salt, C6-C20 monoalkyl sulfate salt, C6-C20 alkylpolyglycol ether sulfate salt, C6-C20 mono- and di-alkyl sulfosuccinate salts, C6-C20 α-olefin sulfonate salt, and a C6-C20 sulfonated fatty acid salt.

The anionic surfactant may be in the form of a sodium salt. The anionic surfactant may also be in the form of the other alkali metal salt or alkaline earth metal salt, such as potassium, magnesium or lithium. In addition, the anionic surfactant may be present in the form of an ammonium or mono-, di-, tri- or tetra-alkylammonium salt.

Particular examples of the anionic surfactant include sodium dodecylbenzenesulfonate (SDBS), sodium dodecyl sulfate, sodium dihexylsulfosuccinate, or the like.

The anionic surfactant may be used for each of the first porous coating layer and the second porous coating layer independently in an amount of 0.1-20 wt % based on the weight of each of the first porous coating layer and the second porous coating layer. When the amount of the anionic surfactant satisfies the above-defined range, it is possible to adsorb an excessive amount of transition metal ions dissolved out of a cathode, to prevent deposition of transition metal ions on the surface of an anode, to prevent generation of an excessive amount of air bubbles, and thus to facilitate preparation of slurry and manufacture of a separator.

According to the present disclosure, the inorganic particles include boehmite particles and non-boehmite particles. As used herein, the term 'non-boehmite particles' refers to inorganic particles other than boehmite particles. The porous coating layer according to the present disclosure includes two different types of inorganic particles, such as boehmite particles and inorganic particles other than boehmite particles.

The separator according to the present disclosure uses boehmite particles having relatively low density as inorganic particles of a porous coating layer to assist weight lightening of a separator and an electrochemical device. In addition, it is possible to control a rapid increase in internal temperature of an electrochemical device caused by abnormal operation by virtue of excellent heat-absorbing property of the boehmite particles.

Boehmite is represented by the chemical formula of $AlO(OH)$ or $Al_2O_3 \cdot H_2O$ and is a chemically stable alumina monohydrate obtained generally by heat treatment or hydrothermal treatment of alumina trihydrate in the air. Boehmite has a high dehydration temperature of 450-530° C. and may be controlled to have various shapes, including plate-like boehmite, needle-like boehmite and hexangular plate-like boehmite, by adjusting the preparing condition. In addition, it is possible to control the aspect ratio or particle diameter by controlling the preparing condition. Therefore, it is possible to provide various applications with boehmite by using the properties thereof.

In addition, non-limiting examples of non-boehmite particles may include high-dielectric constant inorganic particles having a dielectric constant of 5 or more, particularly 10 or more, inorganic particles capable of transporting lithium ions or a mixture thereof.

Non-limiting examples of the inorganic particles having a dielectric constant of 5 or more include $BaTiO_3$, $Pb(Zr,Ti)O_3$ (PZT), $Pb_{1-x}La_xZr_{1-y}Ti_yO_3$ (PLZT), $PB(Mg_3Nb_{2/3})O_3$—$PbTiO_3$ (PMN—PT), hafnia ($HfO_2$), $SrTiO_3$, $SnO_2$, $CeO_2$, MgO, NiO, CaO, ZnO, $ZrO_2$, $Y_2O_3$, $Al_2O_3$, $TiO_2$, SiC or a mixture thereof.

As used herein, the term 'inorganic particles capable of transporting lithium ions' refers to inorganic particles which contains a lithium element and functions to transport lithium ions not to store lithium. Non-limiting examples of the inorganic particles capable of transporting lithium ions include lithium phosphate ($Li_3PO_4$), lithium titanium phosphate ($Li_xTi_y(PO_4)_3$, $0<x<2$, $0<y<3$), lithium aluminum titanium phosphate ($Li_xAl_yTi_z(PO_4)_3$, $0<x<2$, $0<y<1$, $0<z<3$), $(LiAlTiP)_xO_y$-based glass ($1<x<4$, $0<y<13$), such as $14Li_2O$-$9Al_2O_3$-$38TiO_2$-$39P_2O_5$, lithium lanthanum titanate ($Li_xLa_yTiO_3$, $0<x<2$, $0<y<3$), lithium germanium thiophosphate ($Li_xGe_yP_zS_w$, $0<x<4$, $0<y<1$, $0<z<1$, $0<w<5$), such as $Li_{3.25}Ge_{0.25}P_{0.75}S_4$, lithium nitride ($Li_xN_y$, $0<x<4$, $0<y<2$), such as $Li_3N$, $SiS_2$-based glass $Li_xSi_yS_z$, $0<x<3$, $0<y<2$, $0<z<4$), such as $Li_3PO_4$—$Li_2S$—$SiS_2$, $P_2S_5$-based glass ($Li_xP_yS_z$, $0<x<3$, $0<y<3$, $0<z<7$), such as $LiI$—$Li_2S$—$P_2S_5$, or a mixture thereof.

In addition, the boehmite particles and the binder polymer are used at a weight ratio of 1:1-1:5.

When the weight ratio of the boehmite particles to the binder polymer is less than 1:1 (when the content of the binder polymer is decreased), the amount of binder which can bind boehmite particles among themselves or perform binding between boehmite particles and the substrate is insufficient, thereby causing separation. When the weight ratio of the boehmite particles to the binder polymer is larger than 1:5 (when the content of the binder polymer is increased), an excessive amount of binder polymer is present to cause a decrease in pore size and porosity of the porous coating layer and an increase in resistance of the separator, which may result in degradation of the performance of a battery.

According to an embodiment of the present disclosure, the weight ratio of the non-boehmite particles to the boehmite particles may be 1:99-99:1.

When the weight ratio of the non-boehmite particles and the boehmite particles satisfies the above-defined range, it is not required to increase the amount of binder polymer significantly in order to prevent separation of boehmite caused by an increased amount of boehmite. In addition, the dispersion stability or processability of a coating composition for forming a porous coating layer is improved significantly, a porous coating layer having a uniform thickness can be formed, and the porosity of a porous coating layer can be controlled with ease.

The boehmite particles may have an average particle diameter 0.01-0.9 times, particularly 0.015-0.85 times, and more particularly 0.02-0.08 times higher than the average particle diameter of the non-boehmite particles.

According to an embodiment of the present disclosure, the non-boehmite particles may have an average particle diameter of 0.5-3 μm, particularly 0.7-2.7 μm, and more particularly 0.9-2.5 μm, while the boehmite particles may have an average particle diameter of 0.05-0.4 μm, particularly 0.07-0.37 μm, and more particularly 0.09-0.35 μm.

According to an embodiment of the present disclosure, the inorganic particles may include non-boehmite particles having an average particle diameter different from the average particle diameter of boehmite particles. Therefore, the dispersibility and coating processability of the inorganic particles in a composition for forming a porous coating layer are improved, controlling of the thickness of a coating layer is facilitated, and degradation of mechanical properties and electrical properties can be improved. In addition, since particles with a smaller particle diameter may be positioned in large pores formed between particles with a larger particle diameter, it is possible to control the size of pores of the resultant porous coating layer. It is also possible to prevent an internal short-circuit during charging and discharging of a battery by improving the density of the porous coating layer and inhibiting a heat shrinking phenomenon of the porous substrate.

Particularly, according to an embodiment of the present disclosure, non-boehmite particles are used in combination with boehmite particles having a smaller particle diameter as compared to the non-boehmite particles. Thus, it is possible to obtain more advantageous effects as described hereinafter, when compared to the use of the same type of inorganic particles merely different in terms of particle size.

For example, when the non-boehmite particles are alumina particles, alumina particles are compounds of aluminum and oxygen which have a chemical formula of $Al_2O_3$ and are known as electric insulators having relatively high heat conductivity and a density of 3.95-4.1 g/cm$^3$.

Meanwhile, the boehmite particles generally have a density of about 2.4-3.1 g/cm$^3$.

In addition, boehmite particles have excellent heat-absorbing property and contain hydroxyl groups to provide high hydrophilicity and to be controlled to have a high specific surface area. Thus, boehmite particles can function as carriers provided with additives useful for electrochemical devices. Further, boehmite has a heat conductivity similar to the heat conductivity of alumina, and thus is useful as a heat conductive filler. Particularly, boehmite having a high aspect ratio shows anisotropy, and thus can provide increased heat conductivity in a predetermined direction even when it is added in a small amount. Thus, when an abnormal temperature increase occurs in an electrochemical device, boehmite can transfer heat to the outside by virtue of its high heat conductivity.

Therefore, when the porous coating layer according to the present disclosure uses alumina particles, which are non-boehmite particles, as larger-particle diameter inorganic particles, in combination with boehmite particles having a smaller average particle diameter and a relatively smaller density as compared to the alumina particles, it is possible to reduce the total weight of a separator and to assist weight lightening of an electrochemical device. In addition, as described above, boehmite particles can be realized as various shapes, such as a plate-like shape, other than a spherical shape. Thus, even when spherical alumina particles are arranged while being adjacent to each other or being spaced apart significantly from each other, boehmite particles can be disposed easily in various shapes of pores among the alumina particles. As a result, it is possible to improve the density and mechanical properties of a porous coating layer significantly and to inhibit heat shrinking of a porous substrate, and thus to prevent an internal short-circuit of an electrochemical device.

For example, when using alumina particles having different average particle diameters, or larger-particle diameter alumina particles and smaller-particle diameter alumina particles, smaller-particle diameter alumina particles are problematic in that they are significantly expensive and are difficult to handle as compared to larger-particle alumina particles. However, according to an embodiment of the present disclosure, alumina particles are used in combination with boehmite particles having a smaller average particle diameter than that of alumina particles. Therefore, it is possible to overcome the above-mentioned problem.

In addition, the binder polymer is used for each of the first porous coating layer and the second porous coating layer independently in an amount of 5-40 wt %, particularly 5-30 wt %, and more particularly 10-30 wt %, based on the weight of each of the first porous coating layer and the second porous coating layer.

When the binder polymer is used in an amount larger than 40 wt %, an excessive amount of binder polymer is present in the pores of the resultant porous coating layer, thereby reducing the pore size and porosity. When the binder polymer is used in an amount less than 5 wt %, peeling resistance of the porous coating layer is decreased, resulting in degradation of adhesion force.

According to an embodiment of the present disclosure, the separator may have a symmetric structure about the porous substrate as a center, when the amount of the binder polymer, that of the inorganic particles and that of the anionic surfactant in the first porous coating layer are the same as the amount of the binder polymer, that of the inorganic particles and that of the anionic surfactant in the second porous coating layer, respectively.

As compared to the conventional separator including a porous coating layer formed on only one surface of a porous substrate, both porous coating layers are bound to a porous substrate. Therefore, it is possible to inhibit the porous substrate form heat shrinking caused by an increase in internal temperature more significantly.

Moreover, since both of the porous coating layers, i.e., the first porous coating layer and the second porous coating layer include the same composition and the same amount of binder polymer, inorganic particles and anionic surfactant to provide the same property of inhibiting reverse shrinking of the porous coating layers to the porous substrate. Therefore, it is possible to prevent distortion of the porous substrate in any one direction.

The porous substrate may be a porous polymer substrate, particularly a porous polymer film substrate or porous polymer non-woven web substrate.

The porous polymer film substrate may include a porous polymer film including a polyolefin, such as polyethylene or polypropylene. For example, such a polyolefin porous polymer film substrate realizes a shut-down function at a temperature of 80-130° C.

Herein, the polyolefin porous polymer film may include a polymer formed of polyethylene, such as high-density polyethylene, linear low-density polyethylene, low-density polyethylene and ultrahigh-molecular weight polyethylene, polypropylene, polybutylene and polypentene, alone or in combination.

In addition, the porous polymer film substrate may be prepared by using various polymers, such as polyesters, in addition to polyolefins and forming the polymers into a film shape. The porous polymer film substrate may be formed to have a stacked structure of two or more film layers, wherein each film layer may include the abovementioned polymers, such as polyolefins and polyesters, alone or in combination.

In addition to the above-mentioned polyolefins, the porous polymer film substrate and the porous non-woven web substrate may include polyethylene terephthalate, polybutylene terephthalate, polyester, polyacetal, polyamide, polycarbonate, polyimide, polyether ether ketone, polyether sulfone, polyphenylene oxide, polyether sulfone, polyphenylene oxide, polyphenylene sulfide, polyethylene naphthalene, or the like, alone or in combination.

Although there is no particular limitation in the thickness of the porous substrate, the porous substrate may have a thickness of 1-100 μm, particularly 5-50 μm. Although the pore size and porosity of the pores present in the porous substrate are not also limited particularly, it is preferred that the pore size and porosity are 0.01-50 μm and 10-95%, respectively.

In the separator according to an embodiment of the present disclosure, the binder polymer used for forming the porous coating layer may be one used currently for forming a porous coating layer in the art. Particularly, a polymer having a glass transition temperature ($T_g$) of −200 to 200° C. may be used. This is because such a polymer can improve the mechanical properties, such as flexibility and elasticity, of the finally formed porous coating layer. Such a binder polymer functions as a binder which connects and stably fixes the inorganic particles with each other, and thus contributes to prevention of degradation of mechanical properties of a separator having a porous coating layer.

In addition, it is not essentially required for the binder polymer to have ion conductivity. However, when using a polymer having ion conductivity, it is possible to further improve the performance of an electrochemical device. Therefore, a binder polymer having a dielectric constant as high as possible may be used. In fact, since the dissociation degree of a salt in an electrolyte depends on the dielectric constant of the solvent for the electrolyte, a binder polymer having a higher dielectric constant can improve the salt dissociation degree in an electrolyte. The binder polymer may have a dielectric constant ranging from 1.0 to 100 (measured at a frequency of 1 kHz), particularly 10 or more.

In addition to the above-mentioned function, the binder polymer may be characterized in that it is gelled upon the impregnation with a liquid electrolyte and thus shows a high degree of swelling. Thus, the binder polymer has a solubility parameter (i.e., Hildebrand solubility parameter) of 15-45 $MPa^{1/2}$ or 15-25 $MPa^{1/2}$ and 30-45 $MPa^{1/2}$. Therefore, hydrophilic polymers having many polar groups may be used more frequently as compared to hydrophobic polymers, such as polyolefins. When the solubility parameter is less than 15 $MPa^{1/2}$ and more than 45 $MPa^{1/2}$, it s difficult for the binder polymer to be swelled with a conventional liquid electrolyte for a battery.

Non-limiting examples of the binder polymer include but are not limited to: polyvinylidene fluoride-co-hexafluoropropylene, polyvinylidene fluoride-co-trichloro ethylene, polymethyl methacrylate, polybutyl acrylate, polyacrylonitrile, polyvinyl pyrrolidone, polyvinyl acetate, polyethylene-co-vinyl acetate, polyethylene oxide, polyarylate, cellulose acetate, cellulose acetate butyrate, cellulose acetate propionate, cyanoethylpullulan, cyanoethylpolyvinylalcohol, cyanoethyl cellulose, cyanoethyl sucrose, pullulan and carboxymethyl cellulose.

Besides the above-mentioned inorganic particles and polymer, the separator according to an embodiment of the present disclosure may further include other additives as ingredients for the porous coating layer.

The separator according to an embodiment of the present disclosure may be obtained by preparing a composition for forming a porous coating layer which includes inorganic particles including boehmite particles and non-boehmite particles other than the boehmite particles, a binder polymer and an anionic surfactant, and then applying the composition onto both surfaces, i.e., one surface and the other surface of a porous substrate, followed by drying.

First, the composition for forming a porous coating layer may be obtained by dissolving a binder polymer and an anionic surfactant into a solvent, adding inorganic particles thereto and dispersing them. The inorganic particles may be added after they are pulverized in advance to a predetermined average particle diameter. Otherwise, the inorganic particles may be added to a binder polymer solution, and then pulverized and dispersed while controlling them to have a predetermined average particle diameter by using a ball milling process, or the like.

Although there is no particular limitation in the process for coating the composition for forming a porous coating layer onto the porous substrate, it is preferred to use a slot coating or dip coating process. A slot coating process includes coating a composition supplied through a slot die onto the whole surface of a substrate and is capable of controlling the thickness of a coating layer depending on the flux supplied from a metering pump. In addition, dip coating includes dipping a substrate into a tank containing a composition to carry out coating and is capable of controlling the thickness of a coating layer depending on the concentration of the composition and the rate of removing the substrate from the composition tank. Further, in order to control the coating thickness more precisely, it is possible to carry out post-metering through a Mayer bar or the like, after dipping.

Then, the porous substrate coated with the composition for forming a porous coating layer is dried by using a dryer, such as an oven, thereby forming porous coating layers having a symmetric structure on both surfaces of the porous substrate.

In the porous coating layers, the inorganic particles are bound among themselves by the binder polymer while they are packed and are in contact with each other. Thus, interstitial volumes are formed among the inorganic particles and the interstitial volumes become vacant spaces to form pores.

In other words, the binder polymer attaches the inorganic particles to each other so that they may retain their binding states. For example, the binder polymer connects and fixes the inorganic particles with each other. In addition, the pores of the porous coating layer are those formed by the interstitial volumes among the inorganic particles which become vacant spaces. The space is defined by the inorganic particles facing each other substantially in a closely packed or densely packed structure of the inorganic particles.

The electrochemical device according to another aspect of the present disclosure includes a cathode, an anode and a separator interposed between the cathode and the anode, wherein the separator is the above-described separator according to an embodiment of the present disclosure.

The electrochemical device includes any device which carries out electrochemical reaction, and particular examples thereof include all types of primary batteries, secondary batteries, fuel cells, solar cells or capacitors such as super capacitor devices. Particularly, among the secondary batteries, lithium secondary batteries, including lithium metal secondary batteries, lithium ion secondary batteries, lithium polymer secondary batteries or lithium ion polymer batteries, are preferred.

The two electrodes, cathode and anode, used in combination with the separator according to the present disclosure are not particularly limited, and may be obtained by allowing electrode active materials to be bound to an electrode current collector through a method generally known in the art. Among the electrode active materials, non-limiting examples of a cathode active material include conventional cathode active materials that may be used for the cathodes for conventional electrochemical devices. Particularly, lithium manganese oxides, lithium cobalt oxides, lithium nickel oxides, lithium iron oxides or lithium composite oxides containing a combination thereof are used preferably. Non-limiting examples of an anode active material include conventional anode active materials that may be used for the anodes for conventional electrochemical devices. Particularly, lithium-intercalating materials, such as lithium metal or lithium alloys, carbon, petroleum coke, activated carbon, graphite or other carbonaceous materials, are used preferably. Non-limiting examples of a cathode current collector include foil made of aluminum, nickel or a combination thereof. Non-limiting examples of an anode current collector include foil made of copper, gold, nickel, nickel alloys or a combination thereof.

The electrolyte that may be used in the electrochemical device according to the present disclosure is a salt having a structure of $A^+B^-$, wherein $A^+$ includes an alkali metal cation such as $Li^+$, $Na^+$, $K^+$ or a combination thereof and $B^-$ includes an anion such as $PF_6^-$, $BF_4^-$, $Cl^-$, $Br^-$, $I^-$, $ClO_4^-$, $AsF_6^-$, $CH_3CO_2^-$, $CF_3SO_3^-$, $N(CF_3SO_2)_2^-$, $C(CF_2SO_2)_3^-$ or a combination thereof, the salt being dissolved or dissociated in an organic solvent including propylene carbonate (PC), ethylene carbonate (EC), diethyl carbonate (DEC), dimethyl carbonate (DMC), dipropyl carbonate (DPC), dimethyl sulfoxide, acetonitrile, dimethoxyethane, diethoxyethane, tetrahydrofuran, N-methyl-2-pyrrolidone (NMP), ethyl methyl carbonate (EMC), gamma-butyrolactone (g-butyrolactone) or a combination thereof. However, the present disclosure is not limited thereto.

Injection of the electrolyte may be carried out in an adequate step during the process for manufacturing a battery depending on the manufacturing process of a final product and properties required for a final product. In other words, injection of the electrolyte may be carried out before the assemblage of a battery or in the final step of the assemblage of a battery.

Examples will be described more fully hereinafter so that the present disclosure can be understood with ease. The following examples may, however, be embodied in many different forms and should not be construed as limited to the exemplary embodiments set forth therein. Rather, these exemplary embodiments are provided so that the present disclosure will be thorough and complete, and will fully convey the scope of the present disclosure to those skilled in the art.

Example 1

<Manufacture of Separator>

Polyvinylidene fluoride-co-hexafluoropropylene (PVdF-HFP) and cyanoethylpolyvinyl alcohol as binder polymers and sodium dodecylbenzene sulfonate (SDBS) as an anionic surfactant were added to acetone and dissolved therein at 50° C. for about 12 hours or more to prepare a binder polymer solution. To the resultant binder polymer solution, alumina ($Al_2O_3$) particles having an average particle diameter of 500 nm as non-boehmite particles were added in combination with boehmite (γ-AlO(OH)) particles having an average particle diameter of 200 nm and then dispersed therein to obtain a slurry for a porous coating layer.

The obtained slurry was coated onto both surfaces of a polyethylene porous membrane (porosity 40%) having a thickness of 9 μm through a dip coating process, while controlling the coating thickness to about 4 μm, to obtain a separator provided with a first porous coating layer and a second porous coating layer individually on both surfaces thereof.

In the resultant separator, the content of the binder polymer, the content of the anionic surfactant and weight ratio of the boehmite particles to the binder polymer in the two porous coating layers, i.e., the first porous coating layer and the second porous coating layer formed on both surfaces of the polyethylene porous membrane are shown in the following Table 1. In addition, the thickness of the finished separator and the loading amount of porous coating layers (weight of porous coating layers per unit area of porous substrate) are shown in the following Table 2.

<Manufacture of Secondary Battery>

First, 96.7 parts by weight of $LiCoO_2$ functioning as a cathode active material, 1.3 parts by weight of graphite functioning as a conductive material and 2.0 parts by weight of polyvinylidene fluoride (PVdF) as a binder were mixed to obtain a cathode mixture. The resultant cathode mixture was dispersed in 1-methyl-2-pyrrolidone functioning as a solvent to form cathode mixture slurry. The slurry was coated onto both surfaces of aluminum foil having a thickness of 20 μm, followed by drying and pressing, to obtain a cathode.

Next, 97.6 parts by weight of graphite as an anode active material, 1.2 parts by weight of styrene-butadiene rubber (SBR) functioning as a binder and 1.2 parts by weight of carboxymethyl cellulose (CMC) were mixed to obtain an anode mixture. The anode mixture was dispersed in ion exchange water functioning as a solvent to form anode mixture slurry. The slurry was coated onto both surfaces of copper foil having a thickness of 20 μm, followed by drying and pressing, to obtain an anode.

$LiPF_6$ was dissolved in a mixed organic solvent containing ethylene carbonate (EC) and propylene carbonate (PC) at a ratio of 1:1 (volume ratio) to a concentration of 1.0M, thereby providing a non-aqueous electrolyte.

The cathode, anode and the separator obtained as described above were stacked so that the separator may be interposed between the cathode and the anode, and received in a pouch. Then, the electrolyte was injected to obtain a lithium secondary battery.

Example 2

<Manufacture of Separator>

A separator was obtained in the same manner as described in Example 1, except that the weight of the binder polymer, weight of the anionic surfactant (sodium dodecylbenzene sulfonate (SDBS)) and the weight ratio of the boehmite particles to the binder polymer were set to the conditions as shown in Table 1, and the thickness of the separator and the loading amount of the porous coating layers were set to the conditions as shown in Table 2.

<Manufacture of Secondary Battery>

A secondary battery was obtained in the same manner as described in Example 1, except that the resultant separator was used.

Comparative Example 1

A separator was obtained in the same manner as described in Example 1, except that the weight of the binder polymer and the weight ratio of the boehmite particles to the binder polymer were set to the conditions as shown in Table 1, the thickness of the separator and the loading amount of the porous coating layers were set to the conditions as shown in Table 2, and no anionic surfactant was used.

In addition, a secondary battery was obtained in the same manner as described in Example 1, except that the resultant separator was used.

Comparative Example 2

A separator was obtained in the same manner as described in Example 1, except that the weight of the binder polymer and the weight ratio of the boehmite particles to the binder polymer were set to the conditions as shown in Table 1, the thickness of the separator and the loading amount of the porous coating layers were set to the conditions as shown in Table 2, and no anionic surfactant was used.

In addition, a secondary battery was obtained in the same manner as described in Example 1, except that the resultant separator was used.

Evaluation of Physical Properties

Evaluation of Heat Shrinkage

Each of the separators according to Examples 1 and 2 and Comparative Examples 1 and 2 was cut into a size of 50 mm×50 mm, positioned between A4 paper sheets, and was allowed to stand in a convection oven at 150° C. for 30 minutes to measure the heat shrinkage in the machine direction (MD) and the heat shrinkage in the transverse direction (TD). Herein, heat shrinkage was calculated according to the formula of [(Initial Length−Length after Heat Treatment)/(Initial Length)]×100]. The results are shown in Table 2 and FIG. 1.

Gurley Rate (Air Permeation Time)

The Gurley rate for each of the separators according to Examples 1 and 2 and Comparative Examples 1 and 2 was determined by the method of ASTM D726-94. Herein, the Gurley rate refers to resistance against air flow and is measured by a Gurley densometer. The Gurley air permeability value described herein is expressed as the time (seconds), i.e. air permeation time, required for 100 cc of air to pass through a section of 1 in$^2$ under a pressure of 12.2 in H$_2$O. The results are shown in Table 2.

Packing Density of Porous Coating Layer

Packing density D of each of the porous coating layers of the separators according to Examples 1 and 2 and Comparative Examples 1 and 2 is defined as density of the porous coating layer loaded to a height of 1 μm per unit area (m$^2$) of the porous substrate.

Herein, $$D = (S_g - F_g)/(S_t - F_t),$$

wherein $S_g$ represents the weight (g) of the unit area (m$^2$) of the separator including the porous coating layer formed on the porous substrate, $F_g$ represents the weight (g) of the unit area (m$^2$) of the porous substrate, $S_t$ represents the thickness (μm) of the separator including the porous coating layer formed on the porous substrate, and $F_t$ represents the thickness (μm) of the porous substrate.

The results are shown in Table 2.

Electrical Resistance (Ω)

Electrical resistance was determined through a half coin cell obtained by injecting an electrolyte (EC:PC=1:1 vol %, LiPF$_6$ 1.0M) to each of the separators according to Examples 1 and 2 and Comparative Examples 1 and 2, and then measuring the resistance of the half coin cell. The results are shown in Table 2.

Evaluation of Transition Metal Ion (Ni, Co, Mn Ion) Adsorption Capability of Separator A salt containing 1 mol of Li was introduced to an electrolyte (EC:PC=1:1 vol %, LiPF$_6$ 1.0M) to prepare an initial electrolyte. Next, each of the separators according to Examples 1 and 2 and Comparative Examples 1 and 2 was dipped in the prepared initial electrolyte for 30 minutes and removed therefrom. Then, the mole number of Ni in the initial electrolyte was analyzed by inductively coupled plasma (ICP).

Figure 4:
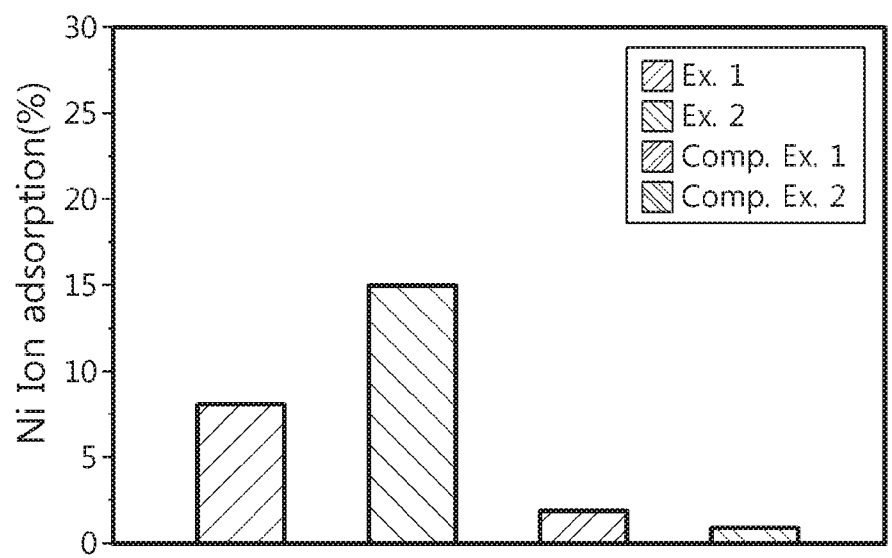
FIG. 4 is a graph illustrating the results of evaluation of the Ni ion adsorptivity of each of the separators according to Examples 1 and 2 and Comparative Examples 1 and 2.

Herein, Ni ion adsorptivity of a separator was calculated by the formula of [(Ni mole number of initial electrolyte−Ni mole number of final electrolyte)/[(Ni mole number of initial electrolyte)]×100(%). The results are shown in Table 2 and FIG. 4.

Figure 5:
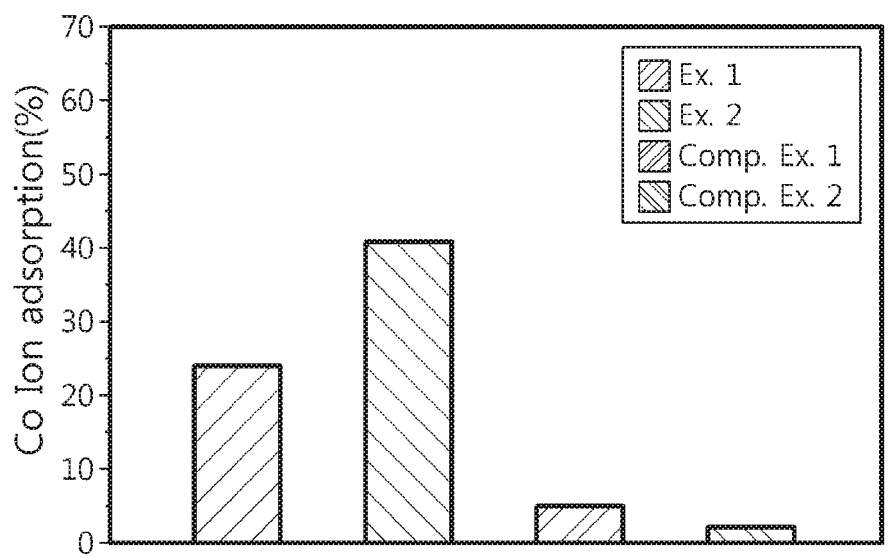
FIG. 5 is a graph illustrating the results of evaluation of the Co ion adsorptivity of each of the separators according to Examples 1 and 2 and Comparative Examples 1 and 2.
Figure 6:
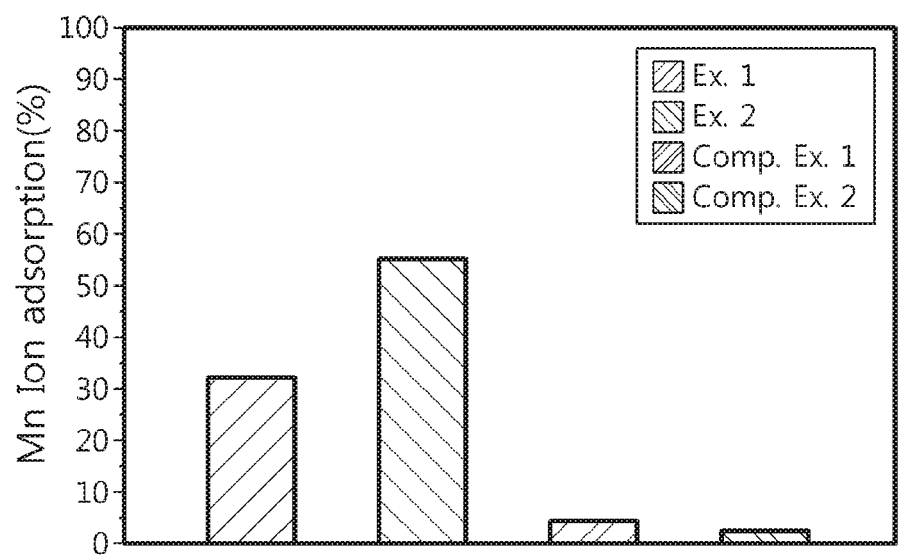
FIG. 6 is a graph illustrating the results of evaluation of the Mn ion adsorptivity of each of the separators according to Examples 1 and 2 and Comparative Examples 1 and 2.

Co ion adsorptivity and Mn ion adsorptivity were calculated in the same manner as described above. The results are shown in Table 2, FIG. 5 and FIG. 6.

Evaluation of Cycle Characteristics

Figure 7:
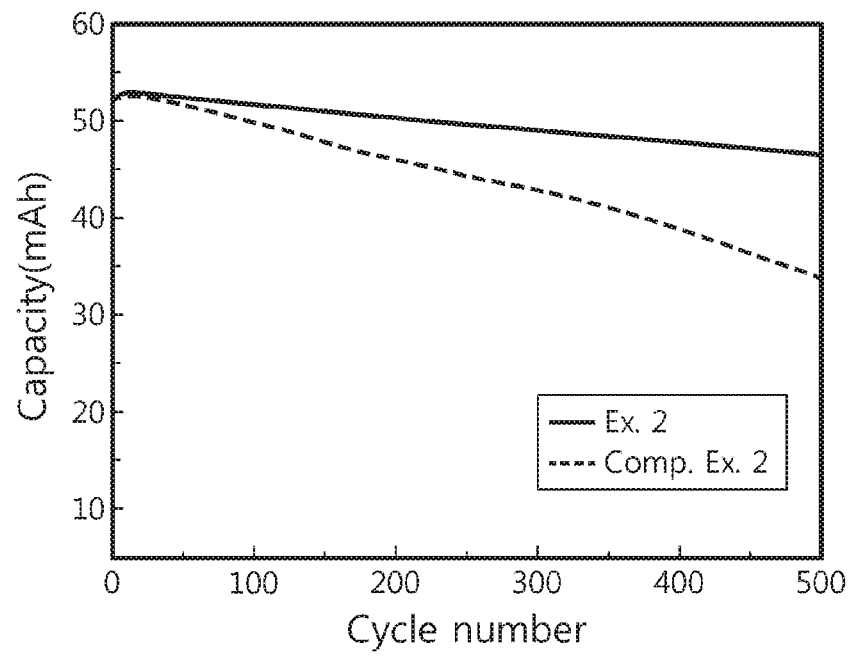
FIG. 7 is a graph illustrating the results of evaluation of the cycle characteristics of each of the secondary batteries according to Example 2 and Comparative Example 2.

Each of the secondary batteries according to Example 2 and Comparative Example 2 was allowed to repeat 500 cycles to determine variations in discharge capacity of each battery, wherein one cycle includes charging the battery to 4.25 V at 45° C. under a constant-current condition of 1.0 C, charging the battery with an electric current of 0.05 C under a constant voltage condition, pausing the battery for 10 minutes, discharging the battery to 3.0V with an electric current of 1.0 C, and pausing the battery for 10 minutes. The results are shown in FIG. 7.

Analysis for Detection of Transition Metal at Anode

Figure 8:
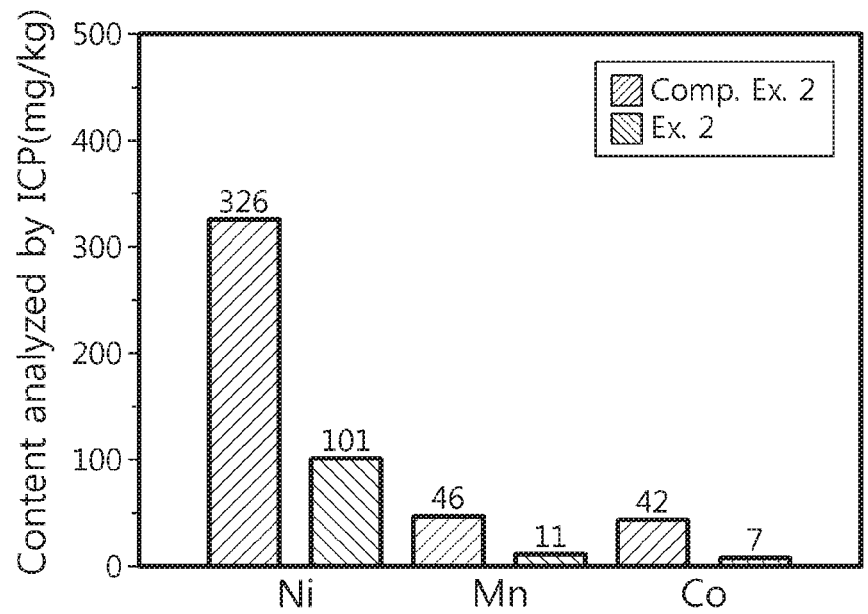
FIG. 8 is a graph illustrating the results of detection of Mn, Ni and Co ions present on each of the anode surfaces of the secondary batteries according to Example 2 and Comparative Example 2 after the evaluation of cycle characteristics for 500 cycles.

After evaluating the cycle characteristics during 500 cycles as described above, each of the secondary batteries according to Example 2 and Comparative Example 2 was disassembled and the anode surface was checked for detection of Mi, Ni and Co ions by using inductively coupled plasma (ICP). The results are shown in FIG. 8.

TABLE 1

| | First Porous Coating Layer | | | Second Porous Coating Layer | | |
|---|---|---|---|---|---|---|
| | Weight of binder polymer based on total weight of porous coating layer (wt %) PVDF-HFP/cyano ethylpolyvinyl alcohol | Weight of anionic surfactant based on total weight of porous coating layer (wt %) | Boehmite particles: binder polymer (weight ratio) | Weight of binder polymer based on total weight of porous coating layer (wt %) PVDF-HFP/cyano ethylpolyvinyl alcohol | Weight of anionic surfactant based on total weight of porous coating layer (wt %) | Boehmite particles: binder polymer (weight ratio) |
| Example 1 | 15/2 | 5 | 2:3 | 15/2 | 5 | 2:3 |
| Example 2 | 10/2 | 10 | 1:1 | 10/2 | 10 | 1:1 |
| Comp. Ex. 1 | 15/2 | 0 | 2:3 | 15/2 | 0 | 2:3 |
| Comp. Ex. 2 | 10/2 | 0 | 1:1 | 10/2 | 0 | 1:1 |

TABLE 2

| | Example 1 | Example 2 | Comp. Ex. 1 | Comp. Ex. 2 |
|---|---|---|---|---|
| Thickness (μm) | 18.1 | 17.9 | 18.2 | 18.3 |
| Loading amount of porous coating layer (g/m$^2$) | 13.5 | 13.3 | 13.5 | 13.4 |
| Gurley (s/100 cc) | 815 | 790 | 820 | 850 |
| Packing density (g/cm$^3$) | 1.45 | 1.47 | 1.45 | 1.44 |
| Heat shrinkage (%) (MD/TD) | 6/5 | 4/3 | 6/6 | 5/5 |
| Electrical resistance (Ω) | 1.01 | 0.98 | 1.02 | 1.04 |
| Transition metal ion adsorptivity (%) (Ni/Co/Mn) | 8/24/32 | 15/41/55 | 2/5/4 | 1/2/2 |

Referring to Table 2 and FIGS. 1-6, it can be seen that adsorption of transition metal ions is increased in each of the separators according to Examples 1 and 2, as the content of the anionic surfactant is increased. It can be also seen that each of the separators according to Examples 1 and 2 shows no difference in terms of physical properties as compared to the separators containing no anionic surfactant according to Comparative Examples 1 and 2.

Referring to FIG. 7, the secondary battery according to Example 2 shows 45° C. cycle characteristics improved significantly as compared to the secondary battery according to Comparative Example 2. Particularly, referring to discharge capacity maintenance after 500 charge/discharge cycles based on the initial discharge capacity, Example 2 shows a discharge capacity maintenance of 90% and Comparative Example 2 shows a discharge capacity maintenance of 65%.

In addition, referring to FIG. 8, after the secondary battery using the separator containing an anionic surfactant according to Example 2 was evaluated for cycle characteristics, it was disassembled and the anode was analyzed by ICP in order to analyze the reason why the battery shows improved cycle characteristics. As a result, it can be seen that the anode of the secondary battery according to Example 2 shows a significantly reduced content of transition metals in the anode as compared to the anode of the secondary battery according to Comparative Example 2. Therefore, it can be seen that the separator containing an anionic surfactant according to an embodiment of the present disclosure adsorbs transition metal ions dissolved out from the cathode, and thus effectively prevents there from being transferred to the anode.

What is claimed is:

1. A separator comprising:
a porous substrate having a plurality of pores; and
a first porous coating layer and a second porous coating layer formed on one surface and the other surface of the porous substrate, respectively,
wherein each of the first porous coating layer and the second porous coating layer independently comprise a plurality of inorganic particles, a binder polymer disposed on a part or the whole of the surface of the inorganic particles so that the inorganic particles are connected and fixed with each other, and an anionic surfactant,
wherein the inorganic particles comprise boehmite particles and non-boehmite particles,
wherein the boehmite particles and the binder polymer are present at a weight ratio of 1:1-1:5,
wherein the binder polymer is present in each of the first porous coating layer and the second porous coating layer independently in an amount of 10-30 wt % based on the weight of each of the first porous coating layer and the second porous coating layer, respectively,
wherein the anionic surfactant is present in each of the first porous coating layer and the second porous coating layer independently in an amount of 5-20 wt % based on the weight of each of the first porous coating layer and the second porous coating layer, respectively,
wherein the binder polymer includes any one selected from the group consisting of polyvinylidene fluoride-co-hexafluoropropylene, polyvinylidene fluoride-co-trichloroethylene, polymethyl methacrylate, polybutylacrylate, polyacrylonitrile, polyvinylpyrrolidone, polyvinylacetate, polyethylene-co-vinyl acetate, polyethylene oxide, polyarylate, cellulose acetate, cellulose acetate butyrate, cellulose acetate propionate, cyanoethylpullulan, cyanoethyl polyvinylalcohol, cyanoethylcellulose, cyanoethylsucrose, pullulan and carboxyl methyl cellulose, or a combination of two or more of them, and
wherein the anionic surfactant is sodium dodecylbenzenesulfonate (SDBS).

2. The separator according to claim 1, wherein the weight ratio of the non-boehmite particles to boehmite particles in each of the first porous coating layer and the second porous coating layer is independently 1:99-99:1.

3. The separator according to claim 1, wherein an amount of the binder polymer, that of the inorganic particles and that of the anionic surfactant in the first porous coating layer are the same as the amount of the binder polymer, that of the inorganic particles and that of the anionic surfactant in the second porous coating layer, respectively.

4. The separator according to claim 1, wherein the non-boehmite particles are inorganic particles having a dielectric constant of 5 or more, inorganic particles capable of transporting lithium ions or a combination thereof.

5. The separator according to claim 1, wherein an average particle diameter of the boehmite particles is 0.01-0.9 times of that of the non-boehmite particles.

6. The separator according to claim 1, wherein an average particle diameter of the non-boehmite particles is 0.5-3 μm.

7. The separator according to claim 1, wherein an average particle diameter of the boehmite particles is 0.05-0.4 μm.

8. The separator according to claim 1, wherein the porous substrate is a polyolefin-based porous substrate.

9. The separator according to claim 1, wherein the boehmite particles and the binder polymer are present at a weight ratio of 1:1-2:3.

10. An electrochemical device comprising:
a cathode, an anode and a separator interposed between the cathode and the anode, wherein the separator is the separator according to claim 1.

11. The electrochemical device according to claim 10, which is a lithium secondary battery.

* * * * *